United States Patent
Seo

(10) Patent No.: US 10,225,875 B2
(45) Date of Patent: Mar. 5, 2019

(54) METHOD AND APPARATUS FOR PERFORMING DIRECT DEVICE-TO-DEVICE COMMUNICATION IN WIRELESS COMMUNICATION SYSTEM SUPPORTING UNLICENSED BAND

(71) Applicant: LG ELECTRONICS INC., Seoul (KR)

(72) Inventor: Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/327,742

(22) PCT Filed: Nov. 27, 2015

(86) PCT No.: PCT/KR2015/012863
§ 371 (c)(1),
(2) Date: Jan. 20, 2017

(87) PCT Pub. No.: WO2016/085295
PCT Pub. Date: Jun. 2, 2016

(65) Prior Publication Data
US 2017/0202043 A1    Jul. 13, 2017

Related U.S. Application Data

(60) Provisional application No. 62/085,325, filed on Nov. 27, 2014.

(51) Int. Cl.
*H04W 76/14*    (2018.01)
*H04W 56/00*    (2009.01)
(Continued)

(52) U.S. Cl.
CPC ............ *H04W 76/14* (2018.02); *H04W 4/70* (2018.02); *H04W 8/24* (2013.01); *H04W 16/14* (2013.01);
(Continued)

(58) Field of Classification Search
CPC ....... H04W 76/14; H04W 56/00; H04W 4/70; H04W 8/24; H04W 16/14; H04W 28/08; H04W 56/0015; H04W 8/005
See application file for complete search history.

(56) References Cited

U.S. PATENT DOCUMENTS 9,100,941 B2 *  8/2015  Ratasuk ............... H04W 76/14
2011/0287794 A1   11/2011  Koskela et al.
(Continued)

FOREIGN PATENT DOCUMENTS

EP    2408234 A1    1/2012

OTHER PUBLICATIONS

Ericsson et al., "Text Proposal on Coexistence Evaluation Assumptions for LAA for TR 36.889," 3GPP TSG RAN WG1 Meeting #79, R1-145453, San Francisco, USA, Nov. 17-21, 2014, 9 pages.
(Continued)

*Primary Examiner* — Ajay Cattungal
(74) *Attorney, Agent, or Firm* — Birch, Stewart, Kolasch & Birch, LLP

(57) ABSTRACT

The present invention relates to a wireless access system supporting an unlicensed band, and provides a method and an apparatus for performing direct device-to-device communication. The method for performing direct device-to-device communication in a wireless access system, according to an embodiment of the present invention, comprises the steps of: receiving, by a terminal, information about an unlicensed band through a licensed band; determining whether or not to receive a data signal in the unlicensed band on the basis of information about the unlicensed band; and receiving a data signal within a predetermined time of the unlicensed band when it is determined to receive the data signal.

14 Claims, 14 Drawing Sheets

(51) Int. Cl.
  *H04W 4/70* (2018.01)
  *H04W 8/24* (2009.01)
  *H04W 16/14* (2009.01)
  *H04W 28/08* (2009.01)
  *H04W 8/00* (2009.01)

(52) U.S. Cl.
  CPC .......... *H04W 28/08* (2013.01); *H04W 56/00* (2013.01); *H04W 56/0015* (2013.01); *H04W 8/005* (2013.01)

(56) References Cited

U.S. PATENT DOCUMENTS

| | | |
|---|---|---|
| 2012/0077510 A1 | 3/2012 | Chen et al. |
| 2013/0265961 A1* | 10/2013 | Van Phan ............... H04W 4/70 370/329 |
| 2013/0315152 A1 | 11/2013 | Ratasuk et al. |
| 2015/0271841 A1* | 9/2015 | Yamada ............ H04W 56/0045 370/329 |
| 2015/0341794 A1* | 11/2015 | Vanderveen ....... G06Q 30/0261 705/14.58 |
| 2016/0066337 A1* | 3/2016 | Sartori .................. H04W 76/14 370/329 |
| 2016/0073408 A1* | 3/2016 | Sartori ............. H04W 72/0453 370/329 |
| 2016/0095092 A1* | 3/2016 | Khoryaev ............. H04W 76/14 370/329 |
| 2017/0188320 A1* | 6/2017 | Xiong ................ H04W 72/044 |
| 2018/0027579 A1* | 1/2018 | Kalhan ................ H04W 76/14 455/454 |

OTHER PUBLICATIONS

LG Electronics, "Candidate solutions for LAA operation," 3GPP TSG RAN WG1 Meeting #78bis, R1-144042, Ljubljana, Slovenia, Oct. 6-10, 2014, 6 pages.

Motorola Mobility, Ed., "Introduction of D2D (ProSe), Dual Connectivity, Small Cell Enhancements, and NAICS features," 3GPP TSG-RAN WG1 Meeting #78bis, R1-144235, Ljubljana, Slovenia, Oct. 6-10, 2014, 213 pages.

* cited by examiner

FIG. 9
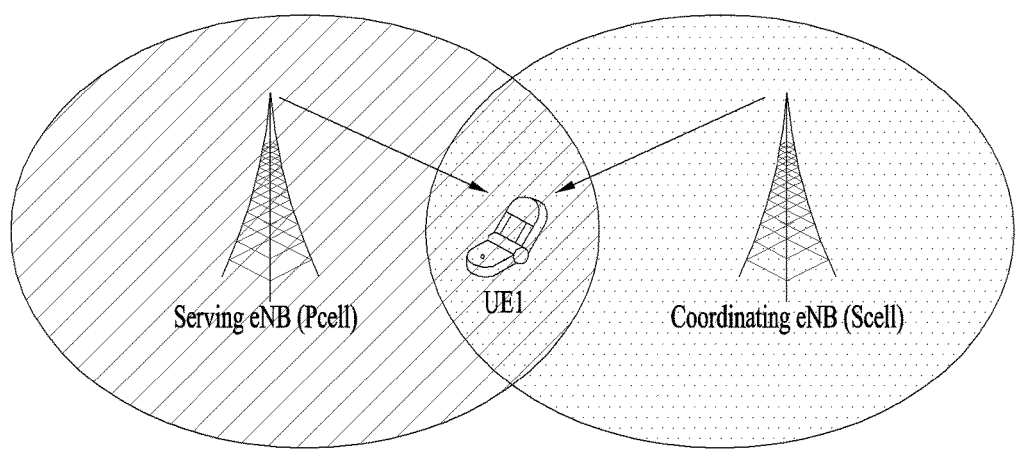
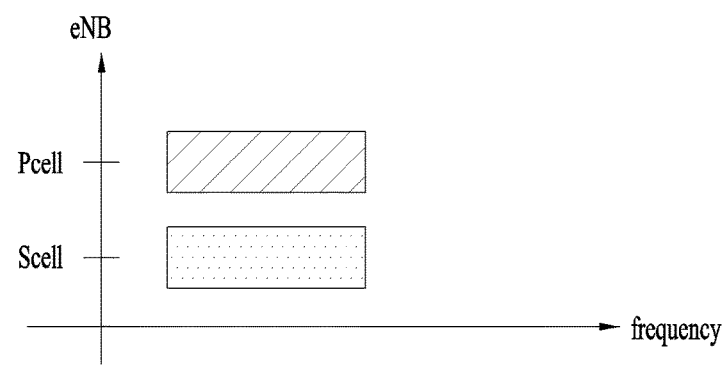

METHOD AND APPARATUS FOR PERFORMING DIRECT DEVICE-TO-DEVICE COMMUNICATION IN WIRELESS COMMUNICATION SYSTEM SUPPORTING UNLICENSED BAND

CROSS REFERENCE TO RELATED APPLICATIONS

This application is the National Phase of PCT International Application No. PCT/KR2015/012863, filed on Nov. 27, 2015, which claims priority under 35 U.S.C. 119(e) to U.S. Provisional Application No. 62/085,325, filed on Nov. 27, 2014, all of which are hereby expressly incorporated by reference into the present application.

TECHNICAL FIELD

The present invention relates to a wireless communication system supporting an unlicensed band, and more particularly, to a method for selecting a transmission resource and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for efficiently performing direct device-to-device communication.

Another object of the present invention is to provide various methods for efficiently performing direct device-to-device communication in a wireless communication system supporting an unlicensed band and an apparatus for supporting the same.

The technical objects that can be achieved through the present invention are not limited to what has been particularly described hereinabove and other technical objects not described herein will be more clearly understood by persons skilled in the art from the following detailed description.

Technical Solution

The present invention relates to a wireless access system supporting an unlicensed band, and provides methods for performing direct device-to-device communication.

In one aspect of the present invention, a method for performing direct device-to-device communication in a wireless access system supporting an unlicensed band comprises the steps of receiving, by a UE, information on the unlicensed band through a licensed band; determining whether or not to receive a data signal at the unlicensed band on the basis of the information on the unlicensed band; and receiving the data signal within a predetermined time of the unlicensed band when it is determined to receive the data signal.

In another aspect of the present invention, a method for performing direct device-to-device communication in a wireless access system supporting an unlicensed band comprises the steps of transmitting, from a UE, information on the unlicensed band through a licensed band; and transmitting a data signal at the unlicensed band in accordance with the information on the unlicensed band. In this case, the method may further comprise the step of receiving information, which indicates whether to transmit the data signal, from the other UE.

In still another aspect of the present invention, an apparatus for performing direct device-to-device communication in a wireless access system supporting an unlicensed band comprises a transceiver for transmitting information on the unlicensed band through a licensed band; and a processor for determining whether or not to receive a data signal at the unlicensed band on the basis of the information on the unlicensed band. In this case, the processor may control the transceiver to receive the data signal within a predetermined time of the unlicensed band when it is determined to receive the data signal.

In further still another aspect of the present invention, an apparatus for performing direct device-to-device communication in a wireless access system supporting an unlicensed band comprises transceiver for transmitting information on the unlicensed band through a licensed band; and a processor. In this case, the processor may control the transceiver to transmit a data signal at the unlicensed band in accordance with the information on the unlicensed band.

The followings may commonly be applied to the aspects of the present invention.

The information on the unlicensed band may periodically be transmitted.

Also, the information on the unlicensed band may include at least one of ID of a transmitting UE, ID of a receiving UE, information on a location of the unlicensed band, and ID of a synchronization reference cell.

If the information on the unlicensed band includes ID of the synchronization reference cell, the information on the unlicensed band may be transmitted at the licensed band in accordance with synchronization of a serving cell of the UE, and the data signal may be transmitted at the unlicensed band in accordance with synchronization of the synchronization reference cell.

The information on the unlicensed band may be transmitted through a PSCCH (Physical Sidelink Control Channel) or a PSDCH (Physical Sidelink Discovery Channel).

The information on the unlicensed band may be transmitted using a TA (Timing Advance) field within the PSCCH.

Moreover, a resource to which the information on the unlicensed band is transmitted may be allocated from a network through higher layer signaling.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the embodiments of the present invention, direct device-to-device communication can efficiently be performed. Also, various methods for transmitting and receiving a signal by using direct device-to-device communication in a wireless access system supporting an unlicensed band and apparatuses for supporting the same can be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 9 is a conceptual diagram illustrating a CoMP system operated based on a CA environment.

BEST MODE FOR CARRYING OUT THE INVENTION

Figure 1:
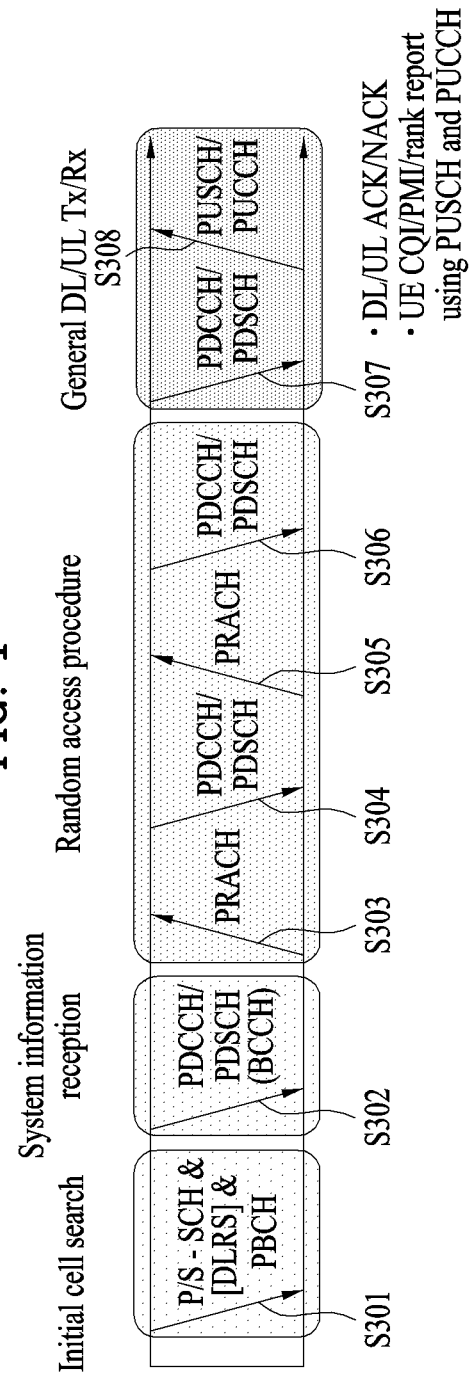
FIG. 1 is a diagram illustrating physical channels and a signal transmission method using the physical channels.

Embodiments of the present disclosure as described below in detail relate to a wireless access system supporting an unlicensed band, and provide a method for configuring a Transmission Opportunity Period (TxOP) and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
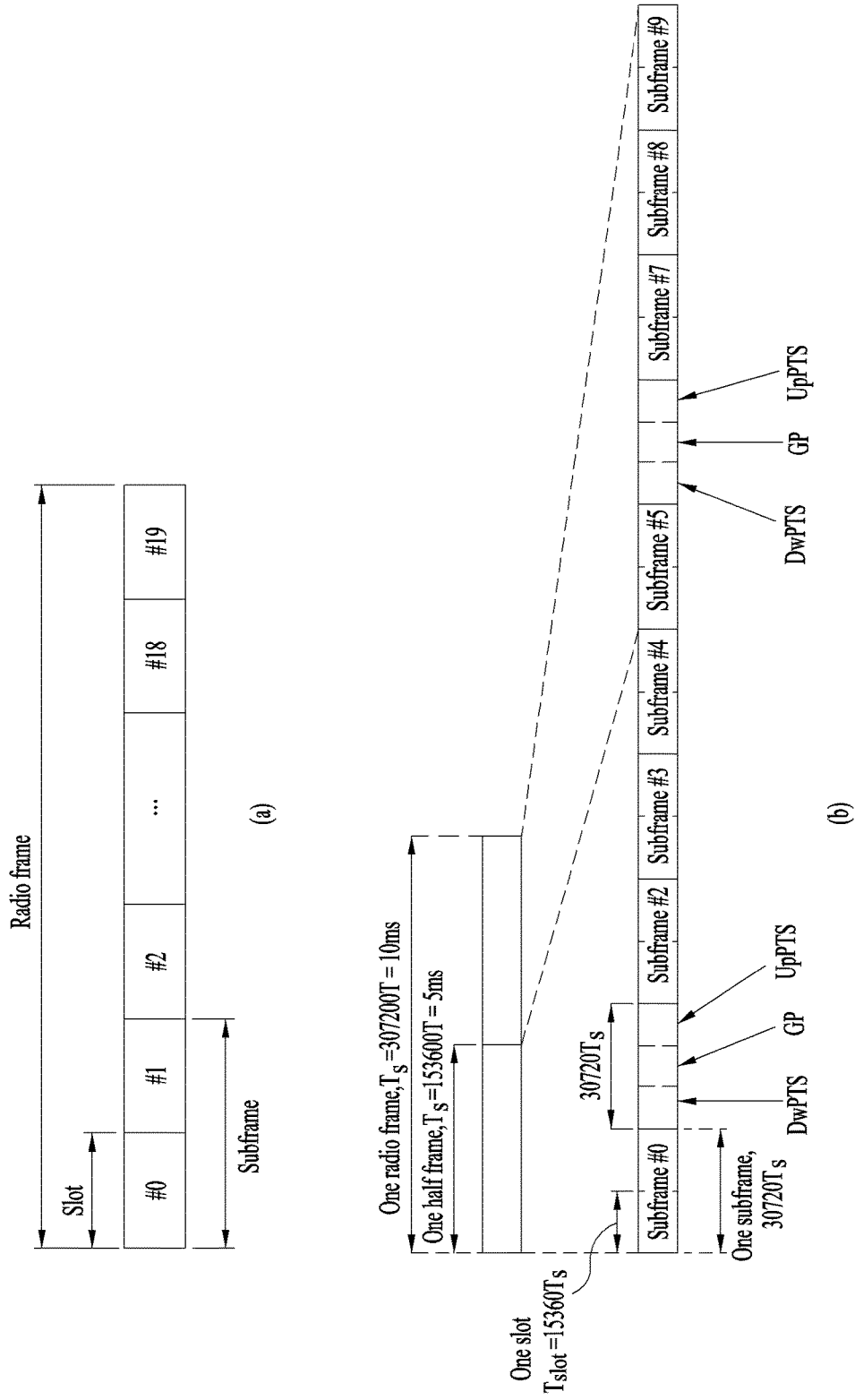
FIG. 2 is a diagram illustrating a structure of a radio frame.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2($b$) illustrates frame structure type 2. Frame structure type 2 is applied to a Time Division Duplex (TDD) system. One radio frame is 10 ms (Tf=307200·Ts) long, including two half-frames each having a length of 5 ms(=153600·Ts) long. Each half-frame includes five subframes each being 1 ms(=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

number of RBs in a DL slot, NDL depends on a DL transmission bandwidth. A UL slot may have the same structure as a DL slot.

Figure 4:
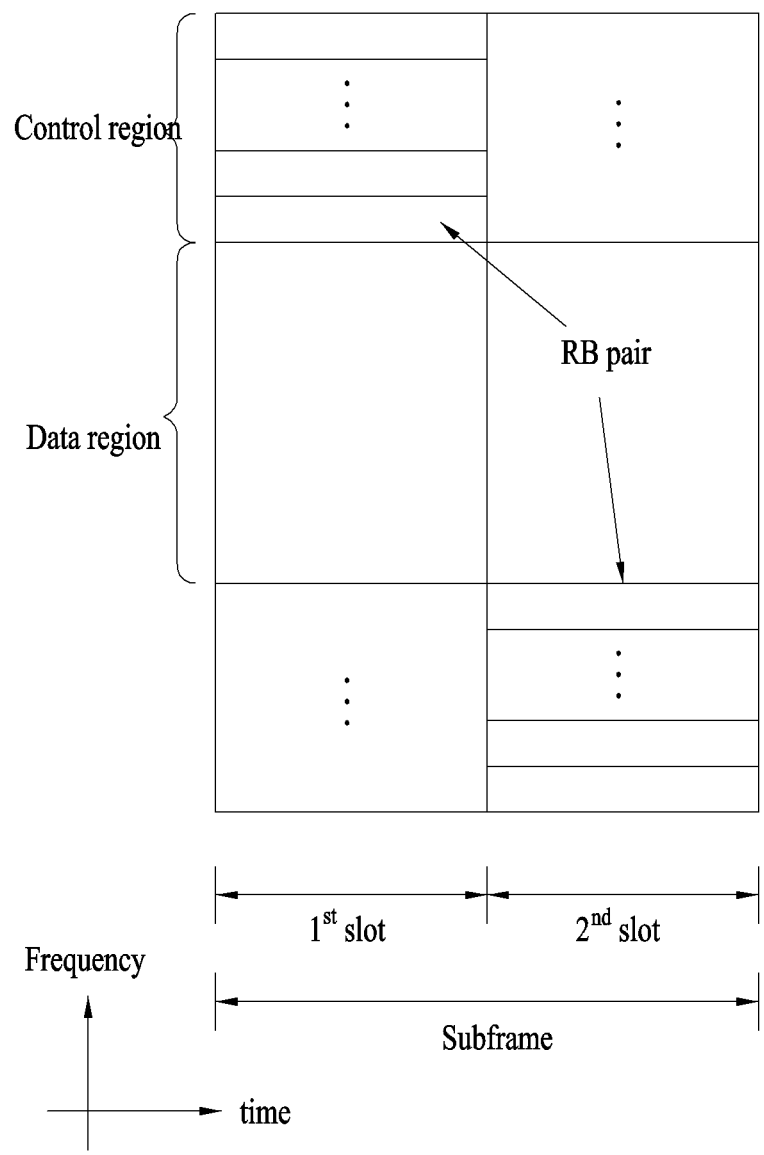
FIG. 4 is a diagram illustrating a structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
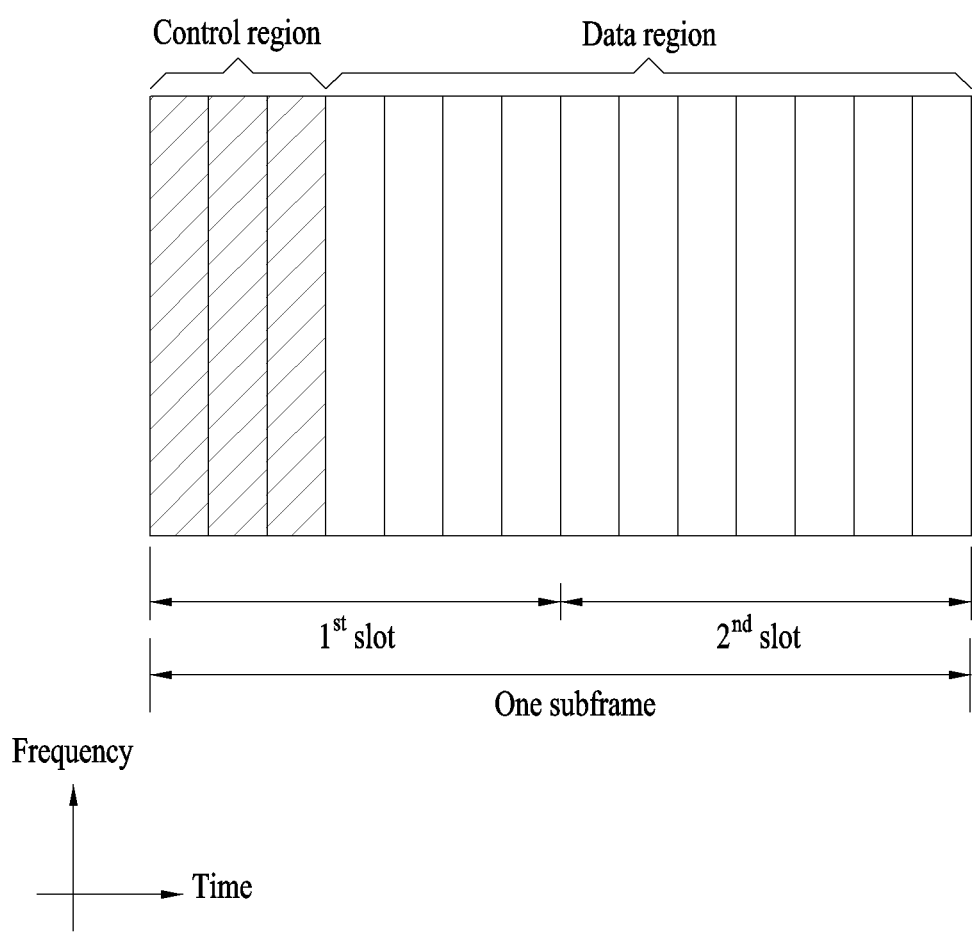
FIG. 5 is a diagram illustrating a structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Synchronization Signal

The UE performs an initial cell search procedure such as acquisition of time and frequency synchronization with a cell and detection of physical layer cell identity NcellID of

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
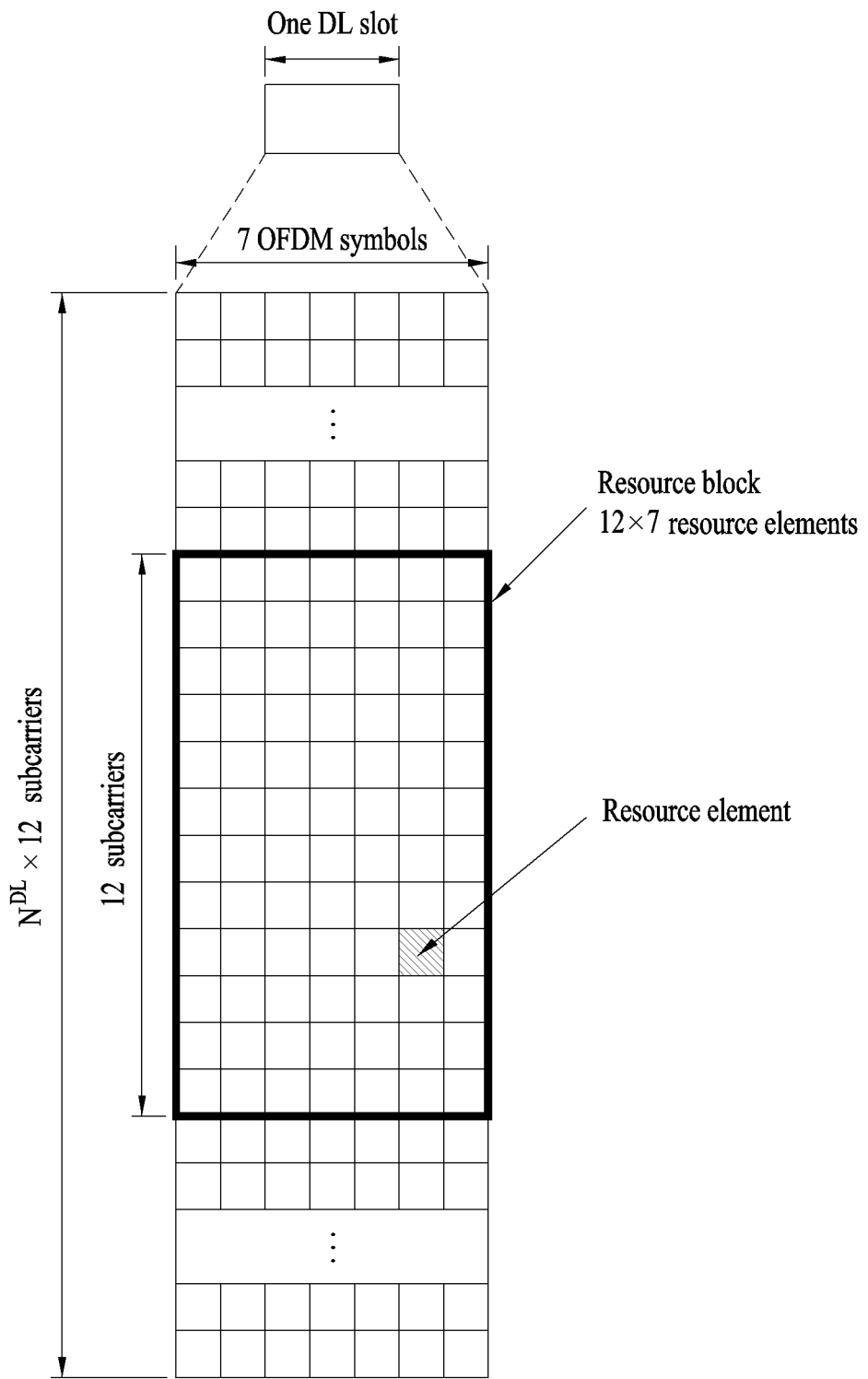
FIG. 3 is a diagram illustrating an example of a resource grid of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The the cell when it desires to newly enter the cell or its power is turned on. To this end, the UE may synchronize with the eNB by receiving synchronization signals, for example, a primary synchronization signal (PSS) and a secondary synchronization signal (SSS) from the eNB, and may acquire information such as cell ID, etc.

In more detail, a Zadoff-Chu (ZC) sequence of a length of 63 is defined in a frequency domain in accordance with the following Equation 1 and used as PSS d(n), whereby the PSS may acquire time domain synchronization and/or frequency domain synchronization such as OFDM symbol synchronization and slot synchronization.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In the above Equation 1, u indicates a ZC root sequence index, and is defined in the current LTE system as illustrated in Table 4 below.

TABLE 2

| $N_{ID}^{(2)}$ | Root index u |
| --- | --- |
| 0 | 25 |
| 1 | 29 |
| 2 | 34 |

Next, the SSS is used to acquire frame synchronization, cell group ID and/or CP configuration (that is, usage information of normal CP or extended CP) of the cell, and is configured by interleaving combination of two binary sequences of a length of 31. That is, SSS sequences are $d(0), \ldots, d(61)$, and have a total length of 62. Also, the SSS sequences are defined differently from each other depending on whether the SSS sequences are transmitted at subframe #0 or subframe #5 as expressed by the following Equation 2. However, in the Equation 2, n is an integer between 0 and 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In more detail, the synchronization signals are transmitted from the first slot of the subframe #0 and the first slot of the subframe #5 in consideration of a global system for mobile communication (GSM) frame length of 4.6 ms for facilitation of inter-radio access technology (inter-RAT) measurement. Especially, the PSS is transmitted from the last OFDM symbol of the first slot of the subframe #0 and from the last OFDM symbol of the first slot of the subframe #5, and the SSS is transmitted from the second to last OFDM symbol of the first slot of the subframe #0 and from the second to last OFDM symbol of the first slot of the subframe #5. A boundary of a corresponding radio frame may be detected through the SSS. The PSS is transmitted from the last OFDM symbol of a corresponding slot and the SSS is transmitted from an OFDM symbol immediately before the OFDM symbol from which the PSS is transmitted.

An SS may represent a total of 504 unique physical layer cell IDs through a combination of 3 PSSs and 168 SSSs. In other words, the physical layer cell IDs are grouped into 168 physical layer cell ID groups, each of which includes three unique IDs so that each physical layer cell ID is a part of only one physical layer cell ID group. Accordingly, a physical layer cell ID $N^{cell}_{ID}$ is uniquely defined by number $N^{(1)}_{ID}$ in the range of 0 to 167 indicating a physical layer cell ID group and number $N^{(2)}_{ID}$ from 0 to 2 indicating the physical layer ID in the physical layer cell ID group. The UE may be aware of one of three unique physical layer IDs by detecting the PSS, and may be aware of one of 168 physical layer cell IDs associated with the physical layer ID by detecting the SSS.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID. Afterwards, the UE may receive intra-cell broadcast information managed by the eNB on a PBCH.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE(=$\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 3] below illustrates PDCCH formats. 4 PDCCH formats are supported according to CCE aggregation levels as illustrated in [Table 3].

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 4] lists DCI according to DCI formats.

TABLE 4

| DCI Format | Description |
| --- | --- |
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 4], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode : Precoding supporting up to eight layers, which are not based on a codebook (Rel-10); and
(10) Transmission mode 10: Precoding supporting up to eight layers, which are not based on a codebook, used for CoMP (Rel-11).

1.4.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.4.4 Blind Decoding (BD)

A plurality of PDCCHs may be transmitted in a subframe. That is, the control region of a subframe includes a plurality of CCEs, CCE 0 to CCE $N_{CCE,k-1}$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 5] illustrates the sizes of CSSs and USSs.

TABLE 5

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \qquad \text{[Equation 3]}$$

Herein, $M^{(L)}$ is the number of PDCCH candidates with CCE aggregation level L to be monitored in the SS, m= 0, . . . , $M^{(L)}-1$, i is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 6] illustrates PDCCH candidates monitored by a UE.

TABLE 6

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 3], for two aggregation levels, L=4 and L=8, $Y_k$ is set to 0 in the CSS, whereas $Y_k$ is defined by [Equation 4] for aggregation level L in the USS.

$$Y_k = (A \cdot Y_{k-1}) \bmod D \qquad \text{[Equation 4]}$$

Herein, $Y_{-1} = n_{RNTI} \neq 0$, $N_{RNTI}$ indicating an RNTI value. A=39827 and D=65537.

1.4 PUCCH (Physical Uplink Control Channel)
1.4.1 General PUCCH

Uplink control information (UCI) transmitted through the PUCCH may include a scheduling request (SR), HARQ ACK/NACK information, and downlink channel measurement information.

The HARQ ACK/NACK information may be generated depending on whether decoding of a downlink data packet on a PDSCH is successful. In a legacy wireless communication system, 1 bit is transmitted as ACK/NACK information for downlink single codeword transmission and 2 bits are transmitted as ACK/NACK information downlink 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted through the PUCCH. When code division multiplexing (CDM) is performed to identify signals of respective UEs from each other, a constant amplitude zero autocorrelation (CAZAC) sequence with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information on downlink data transmitted through the PUCCH is covered using an orthogonal sequence or orthogonal cover (OC).

In addition, control information transmitted onto the PUCCH may be distinguished using cyclically shifted sequences having different cyclic shift (CS) values. The cyclically shifted sequence may be generated by cyclically shifting a base sequence as much as a specific CS amount. The specific CS amount is indicated by a CS index. The number of available CSs may be varied depending on channel delay spread. Various types of sequences may be used as the base sequence and the aforementioned CAZAC sequence is an example of the base sequence.

In addition, the amount of control information that can be transmitted from the UE at one subframe may be determined depending on the number of SC-FDMA symbols (i.e., SC-FDMA symbols except SC-FDMA symbols used to transmit a reference signal (RS) for coherent detection of PUCCH) that can be used to transmit the control information.

A PUCCH format 1 is used to transmit an SR only. When the SR is transmitted alone, an unmodulated waveform is applied, which will be described in detail below.

A PUCCH format 1a or 1b is used for transmission of HARQ ACK/NACK. When only HARQ ACK/NACK is transmitted at a random subframe, the PUCCH format 1a or 1b may be used. Alternatively, HARQ ACK/NACK and SR may be transmitted at the same subframe using the PUCCH format 1a or 1b.

A PUCCH format 2 is used for transmission of CQI, whereas a PUCCH format 2a or 2b is used for transmission of CQI and HARQ ACK/NACK. For the extended CP, the PUCCH format 2 may be used for transmission of CQI and HARQ ACK/NACK.

Figure 6:
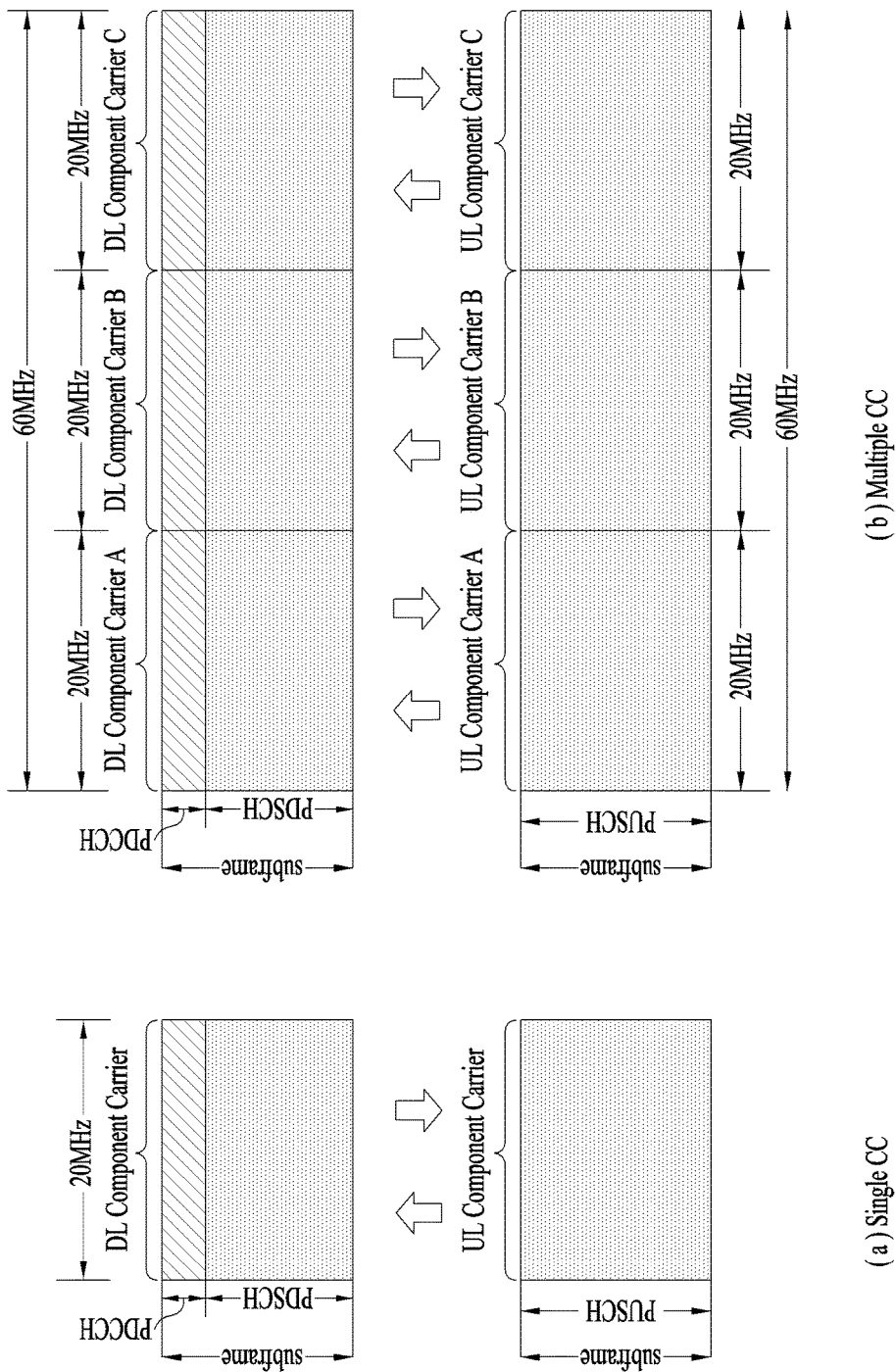
FIG. 6 is a diagram illustrating an example of a component carrier (CC) and carrier aggregation (CA) used in an LTE_A system.

FIG. 6 illustrates a type of mapping of PUCCH formats to PUCCH regions in UL physical resource blocks. In FIG. 6, $N_{RB}^{UL}$ denotes the number of resource blocks on UL, and 0, 1, . . . , $N_{RB}^{UL}-1$ represent physical resource block numbers. Basically, a PUCCH is mapped to both edges of a UL frequency block. As illustrated in FIG. 6, the PUCCH formats 2/2a/2b are mapped to PUCCH regions indicated by m=0 and 1, which may represent that the PUCCH formats 2/2a/2b are mapped to resource blocks positioned at the band-edges. In addition, the PUCCH formats 2/2a/2b and the PUCCH formats 1/1a/1b may be mixed and mapped to a PUCCH region indicated by m=2. The PUCCH formats 1/1a/1b may be mapped to PUCCH regions indicated by m=3, 4, and 5. The number $N^{(2)}_{RB}$ of available PUCCH RBs may be indicated to UEs in a cell by the PUCCH format 2/2a/2b, through broadcast signaling.

1.4.2 PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information on the PDSCH.

2. Carrier Aggregation (CA) Environment
2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
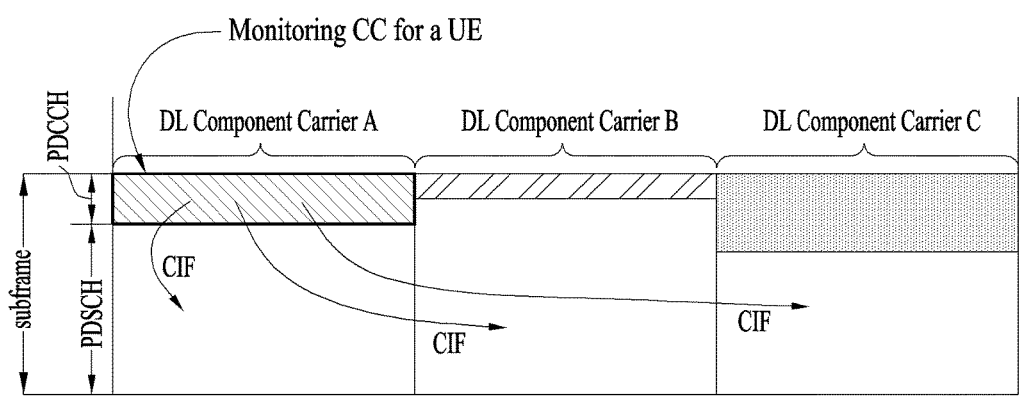
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
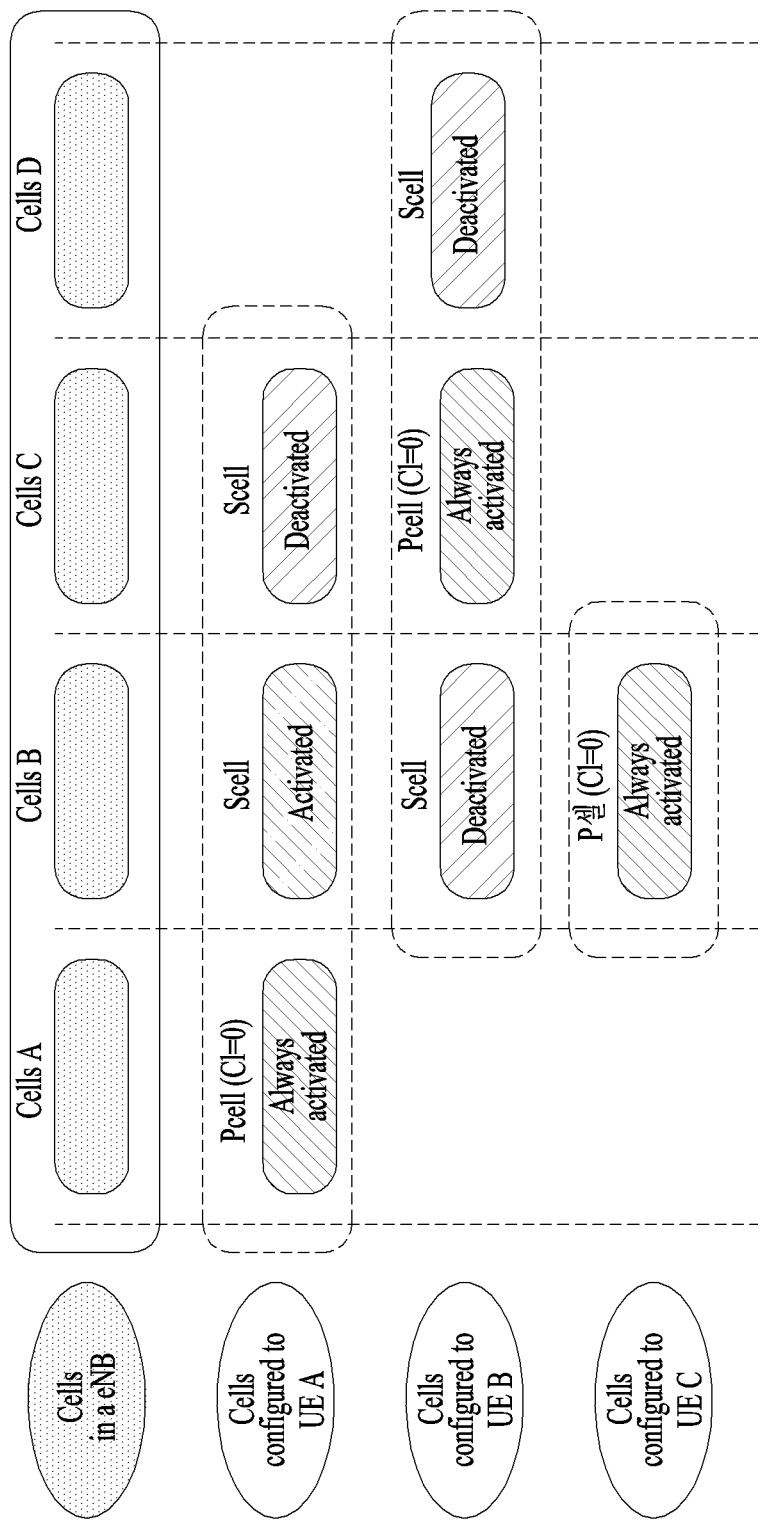
FIG. 8 is a diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 9 is a conceptual view illustrating a CoMP system operating based on a CA environment.

In FIG. 9, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 9 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2. 4 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 10:
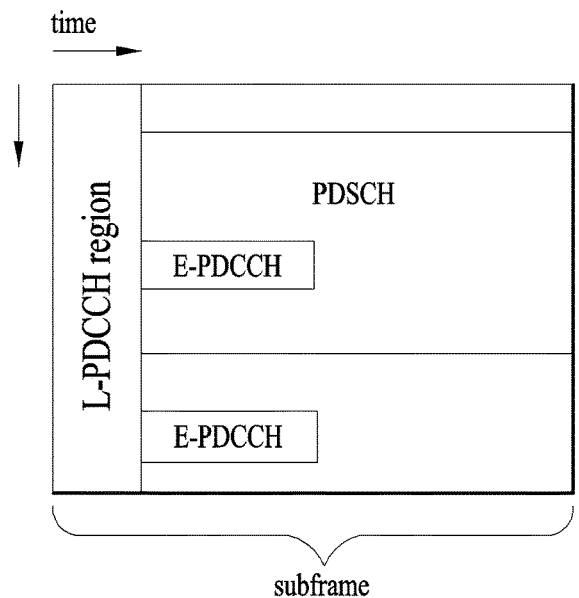
FIG. 10 is a diagram illustrating an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 10 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 11:
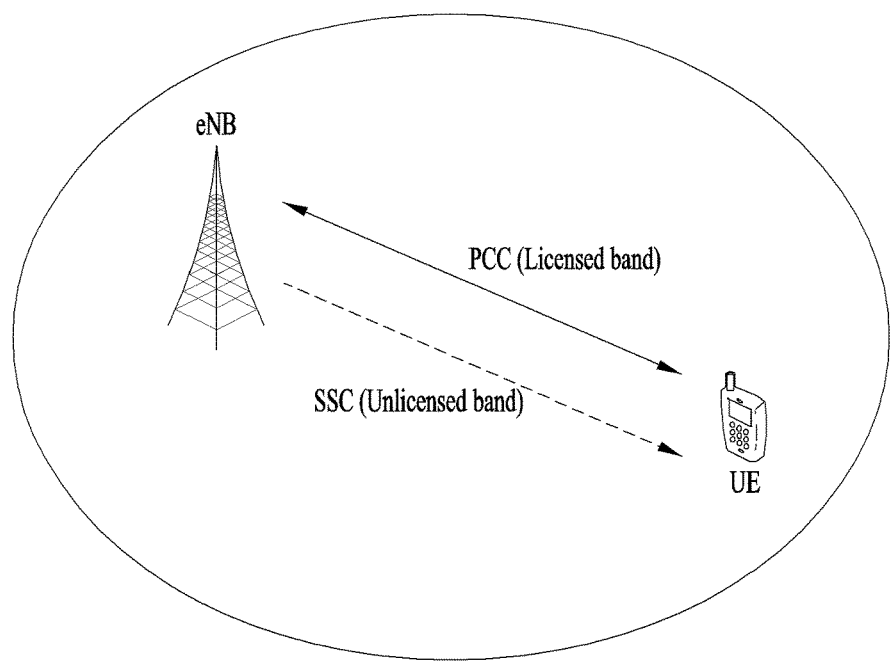
FIG. 11 is a diagram illustrating an example of a CA environment supported in an LTE-U system.

FIG. 11 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 11, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 11 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Hereinafter, methods for scheduling UL resources if a channel is determined as an idle state after the aforementioned CS (that is, LBT) procedure is performed will be described. At this time, in the embodiments of the present invention, the case that the cell S which becomes a target of carrier sensing is 'determined as an idle state' means that the cell S is determined as the idle state by the LBT procedure or repetition of a predetermined number of times corresponding to a backoff counter during a backoff procedure. That is, the cell S finally becomes the idle state as carrier sensing including the backoff procedure or the LBT procedure is completed.

For convenience of description in the embodiments of the present invention, it is assumed that the cell P is operated in the LTE-A system corresponding to the licensed band and the cell S is operated in the unlicensed band (for example, Wifi, BT, etc.). Details of this operation will be understood with reference to FIG. 11.

As described above, if the idle state that the current channel is being used is determined through the aforementioned random backoff procedure or LBT procedure, the eNB may allocate a resource by transmitting a scheduling grant to the UE through (E)PDCCH of the cell P in case of cross-carrier scheduling or (E)PDCCH of the cell S in case of self-scheduling, and may attempt data transmission and reception.

4. Transmission Adjustments

In the LTE system, the time required for the signal transmitted from the UE to reach the eNB may be varied depending on a radius of a cell, a location of the UE in the cell, mobility of the UE, etc. That is, if the eNB does not control UL transmission timing for each UE, the possibility of interference between UEs may exist while the UE and the eNB are performing communication with each other. This may increase the possibility of error in the eNB. The time required for the signal transmitted from the UE to reach the eNB may be referred to as timing advance. If it is assumed that the UE is randomly located within the cell, timing advance of the UE may be varied depending on the location of the UE. For example, if the UE is located at the edge of the cell, timing advance of the UE may be longer than the case that the UE is located at the center of the cell. Also, the timing advance may be varied depending on a frequency bandwidth of the cell. Therefore, the eNB should manage or adjust transmission timing of UEs within the cell to prevent interference between the UEs from occurring. As described above, management or adjustment of transmission timing performed by the eNB may be referred to as maintenance of timing advance or timing alignment.

Timing advance maintenance or timing alignment may be performed through the aforementioned random access procedure. During the random access procedure, the eNB may receive a random access preamble and calculate a timing advance value by using the received random access preamble. The calculated timing advance value may be transmitted to the UE through a random access response, and the UE may update signal transmission timing on the basis of the received timing advance value. Alternatively, the eNB may calculate the timing advance by receiving the uplink reference signal (for example, SRS (Sounding Reference Signal)) transmitted periodically or randomly from the UE, and the UE may update the transmission timing on the basis of the calculated timing advance value.

As described above, the eNB may measure the timing advance of the UE through the random access preamble or the UL reference signal, and may notify the UE of an adjustment value for timing adjustment. In this case, the adjustment value for timing adjustment may be referred to as a timing advance command (TAC). The TAC may be processed by the MAC layer. If the UE receives the TAC from the eNB, the UE assumes that the received TAC is valid for a certain time period only. A timing alignment timer (TAT) may be used to indicate the certain time period. A value of the TAT may be transmitted to the UE through higher layer signaling (e.g., RRC signaling).

Transmission of a UL radio frame i from the UE may start before (NTA+NTAoffset)×Ts seconds at the time when a corresponding DL radio frame starts. The NTA may be in the range of 0≤NTA≤20512, and its offset may be NTAoffset=0 in case of an FDD frame structure and may be NTAoffset=624 in case of a TDD frame structure. The NTA may be indicated by the timing advance command. Ts represents a sampling time. The UL transmission timing may be adjusted in a unit of multiple of 16Ts. The TAC may be given as 11 bits in the random access response, and may indicate a value of 0 to 1282. The NTA may be given by TA*16. Alternatively, the TAC may be 6 bits and indicate a value of 0 to 63. In this case, the NTA may be given by NTA,old+(TA−31)*16. The timing advance command received at the subframe n may be applied from subframe n+6.

4.1 Timing Advance Group (TAG)

Meanwhile, if a plurality of serving cells are used in the UE, serving cells having similar timing advance properties may exist. For example, serving cells using similar frequency properties (e.g., frequency bandwidth) or having similar propagation delay may have similar timing advance properties. Therefore, serving cells having similar timing advance properties may be managed as a group during carrier aggregation to optimize signaling overhead caused by adjustment of a plurality of UL timing synchronizations. This group may be referred to as a timing advance group. Serving cells having similar timing advance properties may belong to one TAG, and at least one of the serving cells in the TAG should have a UL resource. With respect to each serving cell, the eNB may notify the UE of TAG allocation by using TAG identifier through higher layer signaling (e.g., RRC signaling). Two or more TAGs may be configured for one UE. If the TAG identifier indicates 0, the corresponding TAG may mean a TAG that includes PCell. For convenience, the TAG that includes PCell may be referred to as a primary TAG (pTAG), and the other TAGs not the pTAG may be referred to as a secondary TAG (sTAG or secTAG). A secondary TAG identifier (sTAG ID) may be used to indicate a corresponding sTAG. If the sTAG ID is not configured for SCell, the SCell may be configured as a part of the pTAG. One TA may commonly be applied to all CCs which belong to one TA group.

Although the adjustment value for timing alignment may be transmitted through the timing advance command (TAC), the adjustment value may be transmitted through a random access response (hereinafter, referred to as RAR) in response to the random access preamble transmitted from the UE for initial access.

4.2 Case that Cells have a Plurality if TAs

Figure 12:
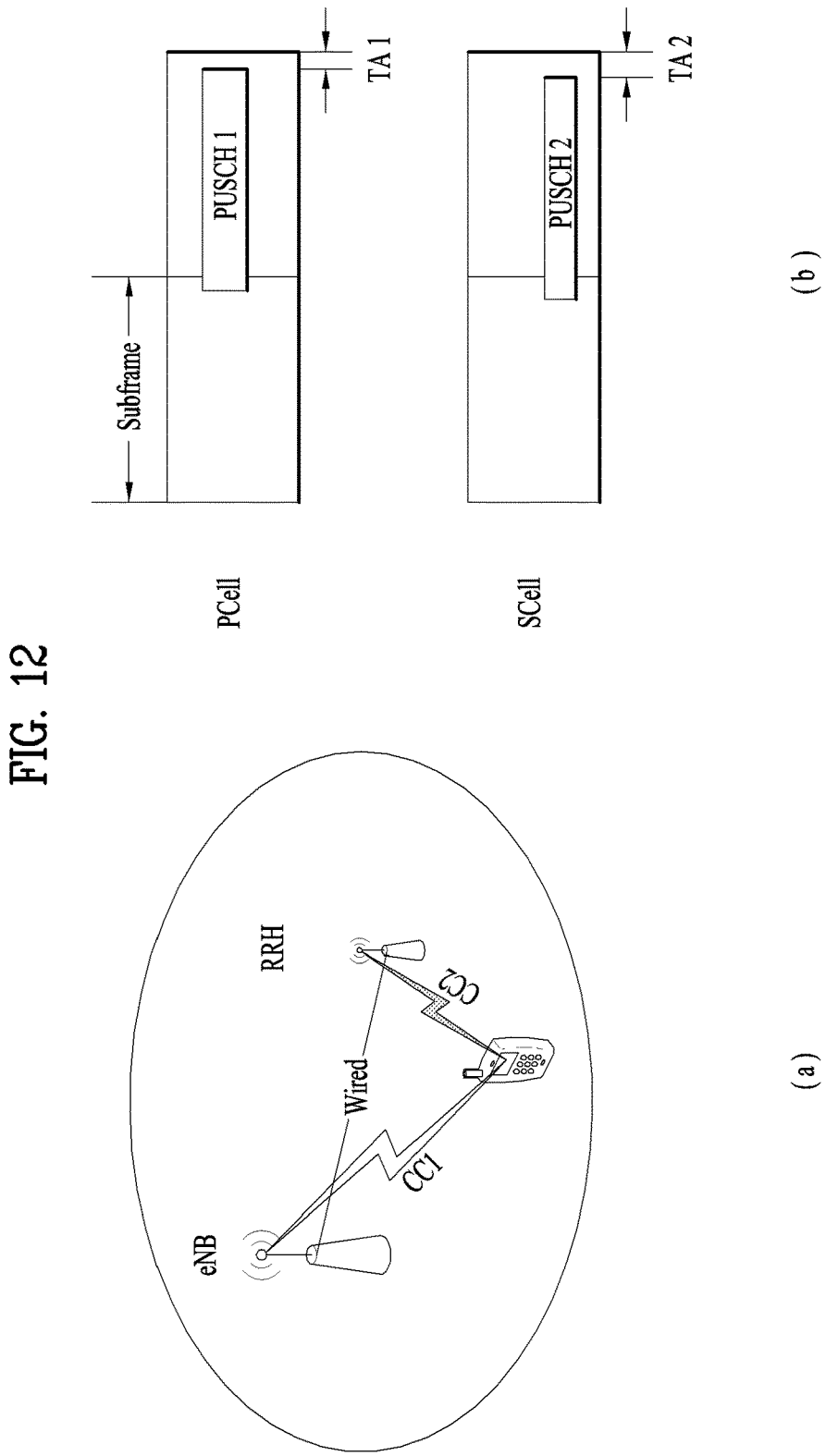
FIG. 12 is a diagram illustrating an example of aggregation of a plurality of cells having different frequency properties.

FIG. 12 illustrates an example of aggregating a plurality of cells with different frequency characteristics. The LTE-A system allows a UE to aggregate a plurality of cells belonging to different frequency bands (i.e., separated far from each other in the frequency domain), a plurality of cells with different propagation characteristics, or a plurality of cells having different coverage. Moreover, in case of a specific cell, it may be considered that RRH (remote radio header) devices such as a repeater are deployed within the cell for the purpose of coverage expansion or coverage hole elimination. For instance, inter-site carrier aggregation may be performed between cells formed in different locations. Here, the RRH can be referred to as a remote radio unit (RRU). The eNB and RRH (or RRU) can be referred to as a node or a transmitting node.

For instance, referring to FIG. 12(a), a UE aggregates two cells (i.e., cell 1 and cell 2). The cell 1 (or cc 1) may be formed to perform direct communication with an eNB without the RRH and the cell 2 may be formed to use the RRH due to limited coverage. In this case, a propagation delay (or eNB's reception timing) of a UL signal transmitted from a UE through the cell 2 (or CC 2) may be different from a propagation delay (or eNB's reception timing) of a UL signal transmitted through the cell 1 due to a location of the UE, frequency characteristics, etc. When a plurality of cells have different propagation delay characteristics as described above, multiple timing advances (TAs) are inevitable.

FIG. 12(b) illustrates a plurality of cells with different TAs. Referring to FIG. 12(b), a UE aggregates two cells (e.g., PCell and SCell). The UE may transmit a UL signal (PUSCH) by applying different TA to each of the two cells.

D2D (Device-to-Device) Communication

When D2D communication is introduced to the aforementioned wireless communication system (e.g., 3GPP LTE system or 3GPP LTE-A system), a scheme for performing the D2D communication will be described in detail.

Hereinafter, a device-to-device communication environment applicable to the present invention will briefly be described.

The D2D communication refers to communication between an electronic device and another electronic device. In a broad sense, the D2D communication refers to wire or wireless communication between electronic devices or communication between a machine and a device controlled by a user. Recently, the D2D communication may generally mean wireless communication between electronic devices operating without human involvement.

Figure 13:
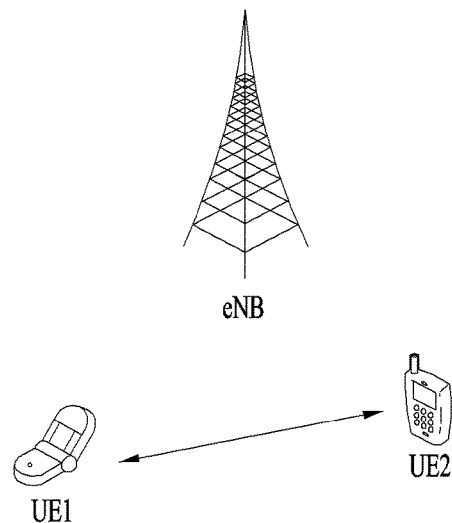
FIG. 13 is a diagram briefly illustrating a direct device-to-device communication system that may be applied to the present invention.

FIG. 13 is a conceptual diagram for explaining D2D communication. In FIG. 13, a device-to-device or UE-to-UE communication scheme is illustrated as an example of the D2D communication. According to this scheme, data can be exchanged between UEs without intervention of an eNB. A direct link established between devices can be referred to as a D2D link. Compared to the conventional eNB-based communication, the D2D communication has advantages in that latency is reduced and the amount of required resources is small. Here, the UE means a terminal of a user. However, if a network equipment such as an eNB transmits and receives signals according to the communication scheme between UEs, the network equipment can also be considered as the UE.

To perform D2D communication, two UEs should mutually acquire time and frequency synchronizations. Generally, if the two UEs are within coverage of the eNB, the two UEs are synchronized with PSS/SSS or CRS transmitted from the eNB, and time/frequency synchronization may be maintained at a level that enables direct signal transmission and reception between the two UEs. In this case, a synchronization signal for D2D communication is referred to as D2DSS. The D2DSS may be configured by the same signal as the PSS/SSS of the LTE system. As described above, the PSS/SSS (or modified signals of PSS/SSS) transmitted for D2D communication are referred to as PD2DSS (primary D2D synchronization signal) and SD2DSS(secondary D2D synchronization signal), respectively. Alternatively, the PSS/SSS are referred to as PSSS (primary sidelink synchronization signal) and SSSS (secondary sidelink synchronization signal), respectively. The PSSS may be used to acquire brief timing in the same manner as the PSS of the LTE system, and may be based on ZC sequence. Also, the SSSS may be used for more exact synchronization in the same manner as the SSS of the LTE system, and may be based on m-sequence. A physical D2D synchronization channel (PD2DSCH or PSBCH (Physical Sidelink Broadcast Channel)) is referred to as a physical channel that carries information required for synchronization, such as system bandwidth, a radio frame and subframe index.

Meanwhile, the D2D transmission signal transmitted through the sidelink may be categorized into a discovery usage and a communication usage. The discovery signal may be represented by a message that includes ID information of a transmitting UE. Since there is no problem in an operation for discovering a UE even in case of relatively long time delay, a resource for transmitting a discovery signal may be represented by a relatively long period. On the other hand, the communication signal is a signal for transferring general data (e.g. voice or picture image information, etc.) desired to be transmitted by the UE. Since this data should be transmitted completely within a relatively short time, a resource for transmitting the communication signal may be represented by a relatively short period.

In more detail, the discovery signal is a signal for identifying a plurality of UEs to which one UE is adjacent. An example of a sidelink channel for transmission and reception of the discovery signal includes a physical sidelink discovery channel (PSDCH). The communication signal is a signal for transferring general data (e.g. voice or picture image information, etc.) desired to be transmitted by the UE, and examples of the sidelink channel for transmission and reception of the communication signal include a Physical Sidelink Broadcast Channel (PSBCH), a Physical Sidelink Shared Channel (PSSCH), and a Physical Sidelink Control Channel (PSCCH).

Meanwhile, D2D communication may also be applied to the LTE system that supports the CA status of a licensed band and an unlicensed band. That is, a frequency resource reserved by D2D communication may be categorized into the licensed band and the unlicensed band. As described above, the licensed band is a frequency band of which exclusive use by means of a specific operator is granted. In this case, it is general that the operator pays a cost for a corresponding band and has an authority for controlling all transmission and reception in accordance with a command of a network equipment such as eNB installed by the operator.

In case of D2D, for example, the eNB may directly command an individual UE to transmit a signal from which resource, or may configure a series of resource pools to allow the individual UE to properly select a resource and transmit a signal.

Meanwhile, the unlicensed band is a band where exclusive use is not granted to a specific operator previously and means a band where a resource may be used by a random UE/equipment if the random UE/equipment has only to comply with a certain rule (for example, compliance of a procedure of identifying whether there is restriction for a maximum continuous occupation time or there is transmission from another equipment prior to signal transmission) for resource use. Generally, the unlicensed band may be used by everyone even without a separate cost, whereas exclusive use of the unlicensed band is not granted. Therefore, the unlicensed band cannot ensure when or which UE will transmit a signal.

D2D signal transmission and reception may be performed at both the licensed band the unlicensed band. However, there is a great difference in utility of the licensed band and the unlicensed band. In case of an operation of D2D signal transmission and reception at the licensed band, a transmission resource of a specific UE can be ensured through a proper resource management of the eNB. Particularly, this attribute is helpful to reduce battery consumption of a UE which receives a D2D signal. For example, the eNB determines a resource to which a D2D signal will be transmitted from a specific UE (or a series of UEs) and notifies receiving UEs of the determined resource, whereby the receiving UEs may perform a receiving operation at the time when transmission of the corresponding UE may occur and turn off a receiving circuit at the other time to reduce unnecessary battery consumption.

On the other hand, since the unlicensed band cannot assure when D2D signal transmission occurs, battery consumption cannot be prevented from occurring through the aforementioned receiving operation. For example, this is because that even though a specific UE previously determines D2D signal transmission at a specific time, another UE/equipment can transmit the signal at the corresponding time. Instead, since the unlicensed band does not need a separate frequency usage fee and can use a wider bandwidth than that of the licensed band, it may be more effective than the licensed band in case of data transmission of high speed at a low cost.

Hereinafter, the present invention suggests a D2D signal transmission scheduling scheme that may properly combine advantages and disadvantages of the licensed band and the unlicensed band.

First of all, a first physical channel that transmits user data is transmitted through the unlicensed band. At this time, for balanced coexistence with another UE/equipment, a transmitting UE may apply a series of restrictions to itself. For example, the transmitting UE may be operated in accordance with a restriction such as compliance of a procedure of identifying whether there is restriction for a maximum continuous occupation time or there is transmission from another equipment prior to signal transmission, and may follow this restriction by using the aforementioned carrier sensing procedure.

However, if a receiving UE regularly monitors a D2D data channel of which transmission timing is not known by the receiving UE, battery consumption may be caused excessively. Therefore, in the present invention, it is suggested that the transmitting UE should periodically transmit a second physical channel, which carries control information, at the licensed band. Preferably, it is suggested that the transmitting UE should transmit the second physical channel periodically, whereby the receiving UE, which has received the physical channel, should be operated to acquire information on the first physical channel The present invention suggests that the UE should transmit received user data through the unlicensed band and transmit control information on the user data through the licensed band as information. In other words, the present invention suggests that the first physical channel for carrying user data should be transmitted through the unlicensed band and the second physical channel for carrying control information for the data should be transmitted through the licensed band. Hereinafter, for convenience of description in the embodiment of the present invention, the first physical channel will be described as a D2D data channel (or PSSCH) and the second physical channel will be described as a D2D control channel (or PSCCH). Moreover, the D2D control channel is referred to as a cross-carrier D2D control channel in view of a control channel for data at a carrier different from a transmitting carrier.

Figure 14:
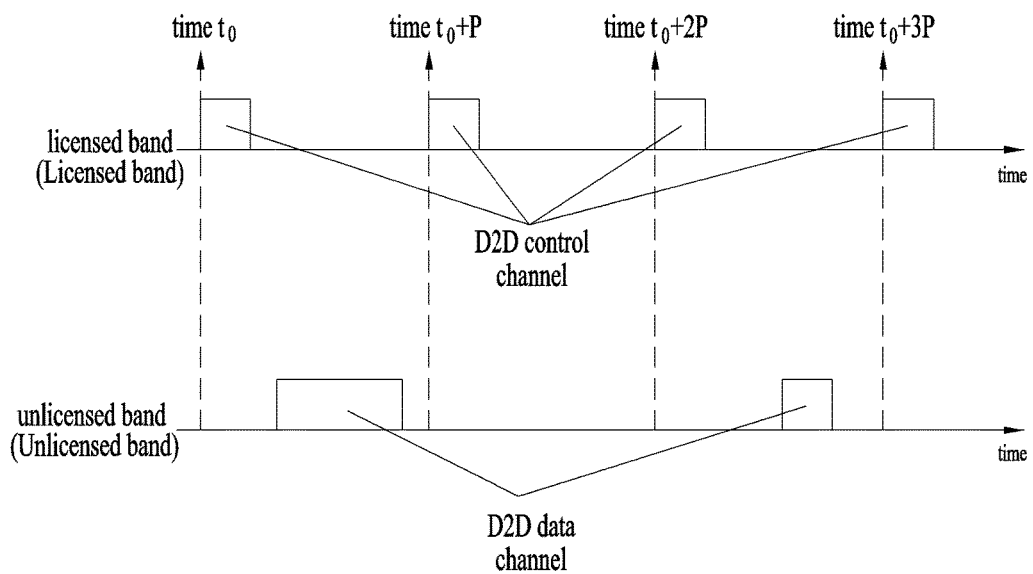
FIG. 14 is a diagram illustrating a method for receiving a data channel using an unlicensed band in a direct device-to-device communication system as an embodiment of the present invention.

FIG. 14 is a diagram illustrating a method for receiving a data channel using an unlicensed band in a direct device-to-device communication system as an embodiment of the present invention.

Referring to FIG. 14, it is suggested that the D2D control channel should be transmitted periodically. In FIG. 14, a cross-carrier D2D control channel transmission resource is allocated to the licensed band at a period of p from a time period of $t_0$. Also, the UE transmits a D2D data channel through the unlicensed band.

Meanwhile, the network may previously notify the receiving UEs of a resource, to which this cross-carrier D2D control channel will be transmitted, through a higher layer signal such as RRC. As a result, unnecessary battery consumption may be reduced in view of the receiving UEs.

However, transmission of the data channel is not always assured due to the unlicensed band. As illustrated in FIG. 14, a time period from $t_0+P$ to $t_0+2P$ corresponds to a case that the corresponding unlicensed band is reserved by another UE/equipment and thus D2D data channel transmission is not possible. Also, a length or location of an occupation time of the D2D transmitting UE may be irregular depending on usage possibility of the unlicensed band even at the other time periods.

As one embodiment of the present invention, the receiving UE may be operated as follows. The receiving UE periodically receives a control channel from the network by receiving resource information of the cross-carrier D2D control channel transmitted at the licensed band. The receiving UE may determine turn-on or turn-off of the receiver at the unlicensed band on the basis of information on the unlicensed band, which is transmitted from the control channel In other words, the receiving UE may determine reception or non-reception of the D2D data channel at the unlicensed band.

If a control channel is detected from a UE which becomes a receiving target, the receiving UE attempts to receive the D2D data channel after turning on the receiver at the related unlicensed band. However, in this case, since it is not possible to assure when the data channel will be transmitted, it is general that the receiving UE attempts to receive the data channel at all possible time periods. However, as described above, even though the receiver has been turned on, transmission of the data channel may not be assured due to the unlicensed band.

On the other hand, if the cross-carrier D2D control channel has been received but the receiving UE is not interested in data reception from the corresponding transmitting UE, the receiving UE may turn off the receiver at the unlicensed band to reduce battery consumption.

In this case, the D2D control channel may be received in accordance with the legacy method for receiving a sidelink physical channel For example, if the PSSCH is used as the physical channel, and if the PSDCH is used as the physical channel by the receiving manner of the PSCCH, the control channel may be detected in accordance with the receiving manner of the PSDCH.

Meanwhile, the transmitting UE may periodically transmit control information through the D2D control channel of the licensed band. In this case, the resource transmitted through the D2D control channel may be allocated from the network through higher layer signaling such as RRC. Also, the resource may be transmitted to the receiving UE through the D2D data channel of the unlicensed band related to the D2D control channel For the aforementioned operation, the cross-carrier D2D control channel transmitted at the licensed band should transfer certain information on the D2D data channel which will be transmitted at the unlicensed band. This is because that the receiving UE may be operated to turn on the receiver at the unlicensed band only if the receiving UE should identify a UE which transmits a D2D data channel at a corresponding unlicensed band after receiving the cross-carrier D2D control channel and thus actual reception is performed meaningfully.

Hereinafter, information on a D2D data channel at an unlicensed band, which will be transferred from a licensed band through a cross-carrier D2D control channel, will be described in more detail.

The information on the D2D data channel may include at least one of ID information of the transmitting UE, ID information of the receiving UE, location information of the unlicensed band to which the D2D data channel will be transmitted, and ID of a synchronized cell. In this case, the location information of the unlicensed band may include at least one of a center frequency of a band and a bandwidth. Also, the ID information of the synchronized cell may include ID information of a cell which becomes a reference of time and/or frequency synchronization.

First of all, this cross-carrier D2D control channel may include ID information of the transmitting UE. The UE which has received the corresponding channel identifies a UE which has transmitted the corresponding channel, and if it is determined as a UE which needs to receive the corresponding channel, the UE receives data by operating the receiver of the unlicensed band. In this case, since capacity of the cross-carrier D2D control channel may be not sufficient to transmit every information on ID of the transmitting UE, partial information may be transmitted. For example, some bits of the ID of the transmitting UE may only be extracted to be transmitted to the cross-carrier D2D control channel.

Next, this cross-carrier D2D control channel may include ID information of the receiving UE. The UE which has received the ID information of the receiving UE identifies that transmission of data to be received by itself is ready if its ID is included in the corresponding information, and operates the receiver of the unlicensed band to receive data. In this case, since capacity of the cross-carrier D2D control channel may be not sufficient to transmit every information on ID of the receiving UE, partial information of the receiving UE ID may only be transmitted. For example, some bits of the receiving UE ID may only be extracted to be transmitted to the cross-carrier D2D control channel. Also, specific data may regard a plurality of UEs as its receiving targets. In this case, group ID is given to a series of UEs. In this case, the transmitting UE may transmit the group ID and the receiving UE may attempt to receive data if the group ID of a group to which itself belongs is received.

For another example, this cross-carrier D2D control channel may transfer location information of the unlicensed band to which the D2D data channel from the corresponding UE will be transmitted. The location information of the unlicensed band may include at least one of a center frequency of a full frequency band and a bandwidth. That is, the cross-carrier D2D control channel may transfer a frequency of a random location at the full frequency band, which is is regarded as a center frequency, and its bandwidth. The UE which has received this information moves to a designated unlicensed band and attempts to receive data of the corresponding UE.

For another example, this cross-carrier D2D control channel may transfer ID of a cell which is synchronized with time and/or frequency during D2D data channel transmission.

Figure 15:
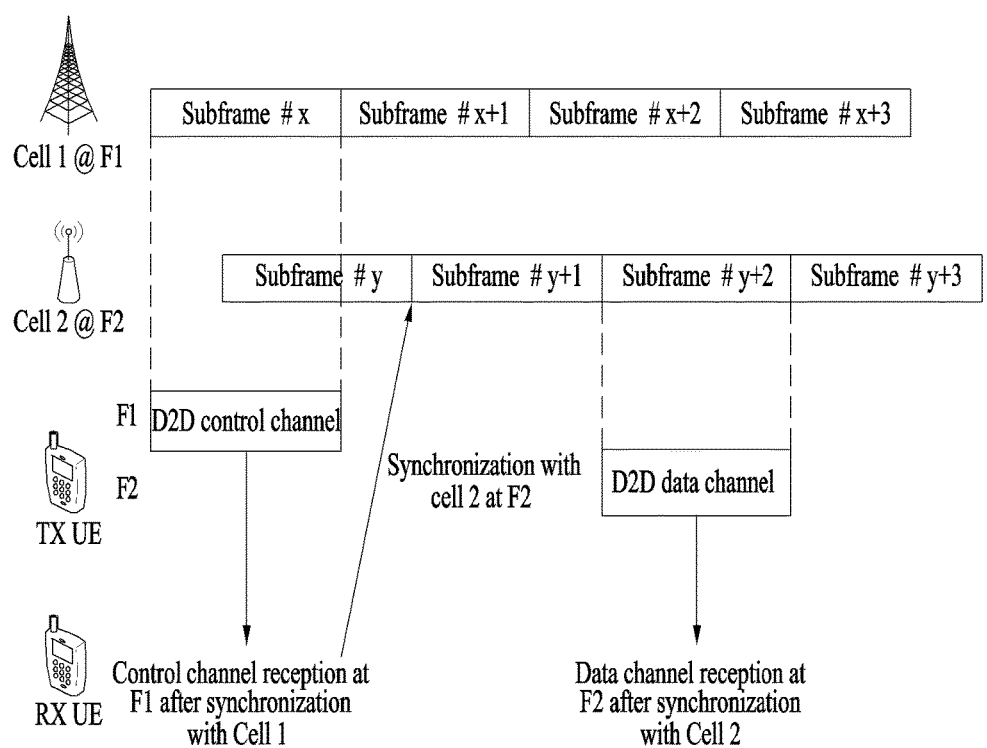
FIG. 15 is a diagram illustrating a method for receiving a data channel using an unlicensed band in a direct device-to-device communication system as another embodiment of the present invention.

FIG. 15 is a diagram illustrating a method for receiving a data channel using an unlicensed band in a direct device-to-device communication system as another embodiment of the present invention. An operation according to a case that ID of a synchronized cell is received through a control channel will be described with reference to FIG. 15.

In FIG. 15, the transmitting UE and the receiving UE are synchronized with a cell 1 at the licensed band, and it is assumed that a licensed band reserved by the cell 1 corresponds to f1. In this case, the cell 1 may be a macro cell, and f1 is a licensed band within the macro cell and may be a band corresponding to 11 MHz, for example.

Also, in FIG. 15, it is assumed that an unlicensed band f2 corresponds to a carrier where a cell 2 is located. In this case, the cell 2 may be a cell of which coverage is smaller than that of the macro cell. The cell 2 is a cell located at the unlicensed band, and may be a cell located in the periphery of the transmitting UE. For example, f2 may be a band corresponding to 3.5 GHz. However, the unlicensed band is not limited to this case, and may correspond to a specific carrier where the cell 2 is not located. Referring to FIG. 12, the transmitting UE transmits the control channel at the licensed band f1 by using the cell 1 as a synchronization reference but may transmit the data channel at the unlicensed band f2 by using the cell 2 as a synchronization reference. Although FIG. 15 illustrates f2 as the unlicensed band, this is only exemplary, and the unlicensed band may correspond to a band such as f3 and f4.

In a state that the cell 1 of the licensed band and the cell 2 of the unlicensed band are not synchronized with each other, if the transmitting UE and the receiving UE are synchronized with the cell 1, the transmitting UE may transmit the control channel at the licensed band by synchronizing with the cell 1, and the receiving UE may receive the control channel without a separate synchronization procedure because the receiving UE is already synchronized with the cell 1.

Meanwhile, the transmitting UE may transmit the data channel at the unlicensed band f2 by using the cell 2 as a synchronization reference. In this case, the transmitting UE may notify the receiving UE that the cell 2 should be used as the synchronization reference. That is, cell ID which becomes the synchronization reference of the channel to be transmitted from f2 may be included in the control channel.

The receiving UE receives information on the D2D data channel transmitted through the cross-carrier D2D control channel By receiving the information on the D2D data channel, the receiving UE may identify that data of the transmitting UE are transmitted by being synchronized with the cell 2 at the unlicensed band. Therefore, the receiving UE is synchronized with the cell 2 and then receives data in accordance with the corresponding synchronization.

Through this procedure, since the receiving UE may more quickly identify a cell which is a synchronization reference at the unlicensed band, time delay until data are received may be reduced. Particularly, this operation is useful in that more transmitting and receiving UEs share the synchronization reference for the control channel if a cell which becomes a synchronization reference of the licensed band has coverage greater than that of the cell which becomes a synchronization reference of the unlicensed band.

Alternatively, if a proper cell is not located in the periphery of the transmitting UE at the unlicensed band where the transmitting UE desires to transmit data, the transmitting UE may notify this fact through the control channel In this case, the information on the D2D data channel may include information indicating that a proper cell does not exist in the periphery of the transmitting UE.

In this case, even though a cell which becomes a synchronization of the control channel does not exist in the unlicensed band, the cell may be used as a synchronization of the data channel.

Hereinafter, a detailed format of the cross-carrier D2D control channel for transferring the above information will be described.

For example, the above information may be transmitted by using a field of the existing control information or defining a new field. Also, the above information may be scrambled or masked with a value of a manner different from the legacy manner.

In the legacy D2D, two kinds of channels have been additionally defined for other uses other than data transmission. One of the channels is for scheduling assignment for transferring resource allocation information for a data channel transmitted from the same UE at the same carrier. In other words, the channel to which scheduling assignment is transmitted is a physical sidelink control channel (PSCCH). The other one of the channels may be a physical sidelink discovery channel (PSDCH). For the second channel, the PSSCH or the PSDCH may be used.

First of all, the second physical channel may be the PSCCH. Hereinafter, a scheme for transmitting the information on the unlicensed band if the PSSCH is used will be described. Also, the PSCCH having a specific format may be used as the second physical channel.

A main object of the scheduling assignment is to transfer a set of subframes to which the data channel is transmitted, a set of RBs, and a modulation and coding scheme. Additionally, the scheduling assignment may have a TA (Timing Advance) field that indicates how the data channel is subjected to timing advance as compared with the scheduling assignment.

The aforementioned cross-carrier D2D control channel may have the same structure (for example, a manner for determining time and frequency resources or a manner for generating a demodulation reference signal) as that of the previously designed scheduling assignment, or may have a modified type of the previously designed scheduling assignment. Particularly, since it is likely that the data channel transmitted at the unlicensed band does not use timing advance, if the structure of the scheduling assignment is reused, the TA field may not be required.

In this case, the TA field may be used for another use, particularly use for transferring information required for the cross-carrier D2D control channel. For example, the TA field may be used to transfer location information transfer of the unlicensed band.

In addition, if a discontinuous time resource is used for transmission at the unlicensed band, another device may reserve the channel, whereby it may be restricted that a continuous time resource is only used. As a result, a time resource allocation field within the scheduling assignment may be reduced or omitted. In this case, the reduced bit may be used for additional information transfer for the aforementioned data channel In this way, some bits of the scheduling assignment may be CRC masked with different values to be identified from the scheduling assignment. Likewise, the scheduling assignment may use a scrambling sequence or demodulation reference signal of a value different from that of the legacy scheduling assignment. Also, the scheduling assignment may use a separate resource pool, whereby the scheduling assignment may be identified from the legacy scheduling assignment in the time/frequency resource. Meanwhile, the second physical channel (or the cross-carrier D2D control channel) may reuse a structure of a discovery channel (physical sidelink discovery channel (PSDCH) which is previously defined. In this case, for identification of the cross-carrier D2D control channel from the legacy discovery channel, the cross-carrier D2D control channel may set CRC mask, scrambling sequence, or demodulation reference signal to a value different from that of the legacy discovery channel. Also, to identify the cross-carrier D2D control channel from the legacy discovery channel, a separate resource pool may be used. Meanwhile, if cross-carrier scheduling is performed using the PSDCH, a control channel to which data information is transmitted may be defined separately at the unlicensed band.

Meanwhile, it is preferable that the transmitting UE initiates data transmission only after identifying that a UE, which desires to receive data of the transmitting UE, is located in the periphery of the transmitting UE. To this end, the receiving UE, which receives the cross-carrier D2D control channel and desires to receive data from the corresponding transmitting UE, may notify the transmitting UE of its intention by transmitting a similar control channel. For example, the transmitting UE may receive information, which indicates whether to transmit the data signal, from the receiving UE. In this case, the indication information may be transmitted through the licensed band.

For example, if the cross-carrier D2D control channel reuses a format of the scheduling assignment, the resource allocated in accordance with the resource allocation of the cross-carrier D2D control channel may be used by the receiving UEs to transmit a response signal.

Although the case that the cross-carrier D2D control channel transfers information on the data channel at the unlicensed band has been describe as above, the same principle may be applied to even the case that information on the data channel at the licensed band is transferred. Particularly, if there are a lot of carriers through which the D2D data channel may be transmitted, a carrier through which data transmission will be performed may be designated through the cross-carrier D2D control channel transmitted through one common carrier. As a result, more effective D2D signal transmission and reception may be performed.

6. Apparatuses

Figure 16:
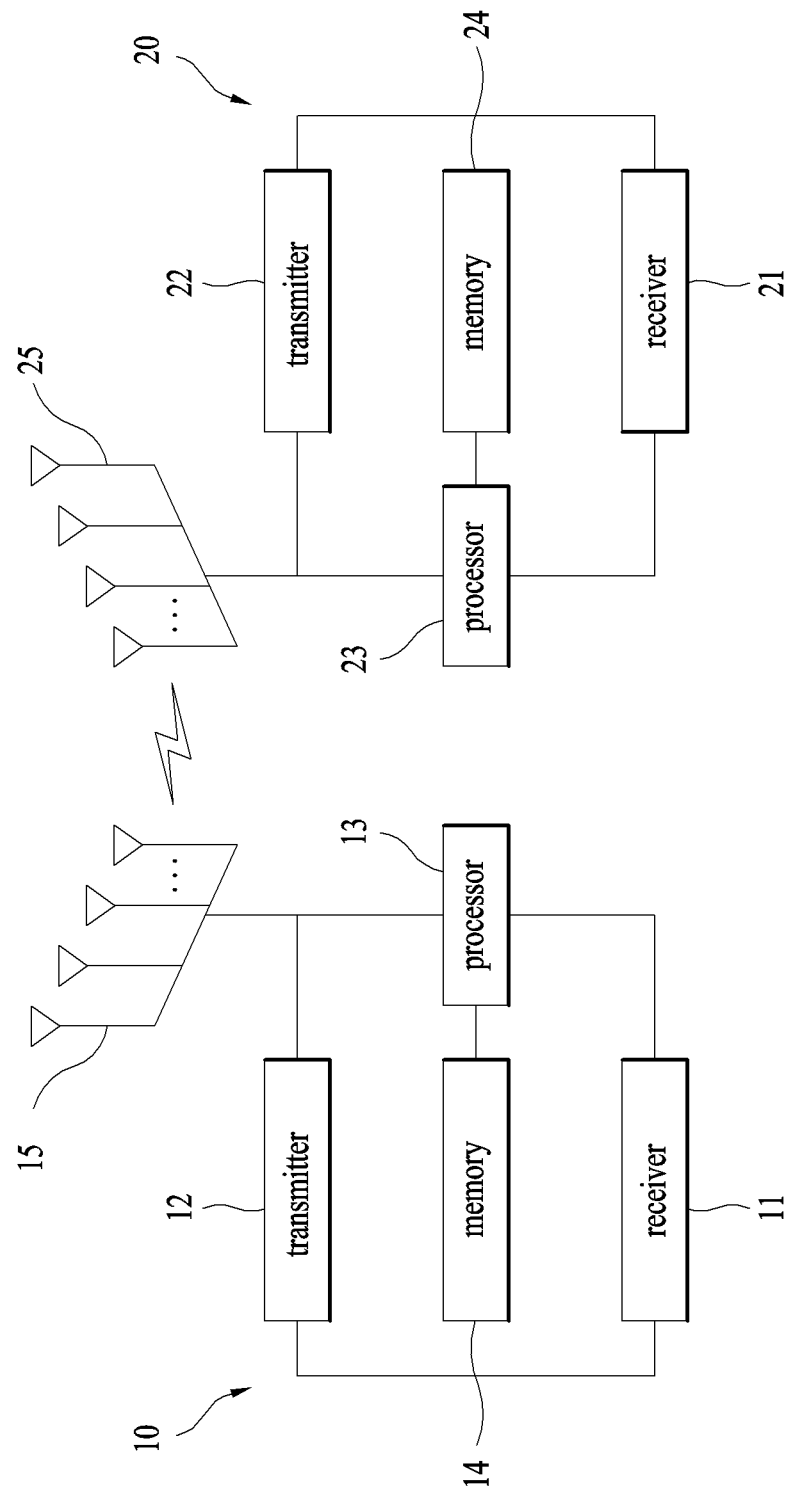
FIG. 16 illustrates an apparatus through which methods described in FIGS. 1 to 15 can be implemented.

Apparatuses illustrated in FIG. 16 are means that can implement the methods described before with reference to FIGS. 1 to 23.

A UE (User Equipment) may act as a transmitter or a receiver on a sidelink. That is, the UE may include a Transmitter 12 or 22 and a Receiver 11 or 21 to control transmission and reception of information, data, and/or messages, and an antenna 14 or 25 for transmitting and receiving information, data, and/or messages.

Also, each of the UE and the eNB may further include a processor 13 or 23 for implementing the afore-described embodiments of the present invention and a memory 14 or 24 for temporarily or permanently storing operations of the processor 13 or 23.

The embodiments of the present invention may be performed using the aforementioned components and functions of the UE and the eNB. For example, the transmitting UE may transmit information on an unlicensed band through a licensed band and transmit a data signal through the unlicensed band. The receiving UE may receive the information on an unlicensed band through the licensed band and receive the data signal through the unlicensed band.

The transmitter and receiver included in the UE may perform a packet modulation/demodulation function for data transmission, a high-speed packet channel coding function, OFDMA packet scheduling, TDD packet scheduling, and/or channel multiplexing function. Also, the UE of FIG. 16 may further include a low-power Radio Frequency (RF)/Intermediate Frequency (IF) unit.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 14 or 24 and executed by the processor 13 or 23. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention is applicable to various wireless access systems. Examples of the various wireless access systems include a 3GPP system, a 3GPP2 system, and/or an IEEE 802.xx system. Besides these wireless access systems, the embodiments of the present disclosure are applicable to all technical fields to which the wireless access systems are applied.

The invention claimed is:

1. A method for performing direct device-to-device communication by a first user equipment (UE) in a wireless access system supporting an unlicensed band, the method comprising:
receiving, from a second UE, information on the unlicensed band through a licensed band;
determining whether or not to receive a data signal at the unlicensed band based on the information on the unlicensed band; and
receiving, from the second UE, the data signal within a predetermined time of the unlicensed band when it is determined to receive the data signal,
wherein the data signal is transmitted in accordance with synchronization of a synchronization reference cell when the information on the unlicensed band includes an identification (ID) of the synchronization reference cell, and
wherein the data signal is transmitted in accordance with synchronization of a serving cell of the second UE when the information on the unlicensed band does not include the ID of the synchronization reference cell.

2. The method according to claim 1, wherein the information on the unlicensed band is periodically transmitted.

3. The method according to claim 1, wherein the information on the unlicensed band includes at least one of an ID of a transmitting UE, an ID of a receiving UE, and information on a location of the unlicensed band.

4. The method according to claim 1, wherein the information on the unlicensed band is transmitted at the licensed band in accordance with synchronization of the serving cell of the second UE.

5. The method according to claim 1, wherein the information on the unlicensed band is transmitted through a Physical Sidelink Control Channel (PSCCH) or a Physical Sidelink Discovery Channel (PSDCH).

6. The method according to claim 5, wherein the information on the unlicensed band is transmitted using a Timing Advance (TA) field within the PSCCH.

7. The method according to claim 1, wherein a resource to which the information on the unlicensed band is transmitted is allocated from a network through higher layer signaling.

8. A method for performing direct device-to-device communication by a first user equipment (UE) in a wireless access system supporting an unlicensed band, the method comprising: comprising:
transmitting, to a second UE, information on the unlicensed band through a licensed band; and
transmitting, to the second UE, a data signal at the unlicensed band in accordance with the information on the unlicensed band,
wherein the data signal is transmitted in accordance with synchronization of a synchronization reference cell when the information on the unlicensed band includes an identification (ID) of the synchronization reference cell, and
wherein the data signal is transmitted in accordance with synchronization of a serving cell of the first UE when the information on the unlicensed band does not include the ID of the synchronization reference cell.

9. The method according to claim 8, wherein the information on the unlicensed band is periodically transmitted.

10. The method according to claim 8, wherein the information on the unlicensed band includes at least one of an ID of a transmitting UE, an ID of a receiving UE, and information on a location of the unlicensed band.

11. The method according to claim 8, wherein the information on the unlicensed band is transmitted at the licensed band in accordance with synchronization of the serving cell of the first UE.

12. The method according to claim 8, further comprising receiving information, which indicates whether to transmit the data signal, from the second UE.

13. An apparatus for performing direct device-to-device communication by a first user equipment (UE) in a wireless access system supporting an unlicensed band, the apparatus comprising:
a transceiver configured to receive, from a second UE, information on the unlicensed band through a licensed band; and
a processor configured to:
determine whether or not to receive a data signal at the unlicensed band based on the information on the unlicensed band, and
control the transceiver to receive, from the second UE, the data signal within a predetermined time of the unlicensed band when it is determined to receive the data signal,
wherein the data signal is transmitted in accordance with synchronization of a synchronization reference cell when the information on the unlicensed band includes an identification (ID) of the synchronization reference cell, and
wherein the data signal is transmitted in accordance with synchronization of a serving cell of the second UE when the information on the unlicensed band does not include the ID of the synchronization reference cell.

14. An apparatus for performing direct device-to-device communication by a first user equipment (UE) in a wireless access system supporting an unlicensed band, the apparatus comprising:
a transceiver configured to transmit, to a second UE, information on the unlicensed band through a licensed band; and a processor configured to:
- control the transceiver to transmit, to the second UE, a data signal at the unlicensed band in accordance with the information on the unlicensed band,
- wherein the data signal is transmitted in accordance with synchronization of a synchronization reference cell when the information on the unlicensed band includes an identification (ID) of the synchronization reference cell, and
- wherein the data signal is transmitted in accordance with synchronization of a serving cell of the first UE when the information on the unlicensed band does not include the ID of the synchronization reference cell.

\* \* \* \* \*